(12) United States Patent
Sun et al.

(10) Patent No.: US 9,189,666 B2
(45) Date of Patent: Nov. 17, 2015

(54) READER FOR FIBER ROUTER

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/467,584

(22) Filed: Aug. 25, 2014

(65) Prior Publication Data

US 2015/0053763 A1    Feb. 26, 2015

(30) Foreign Application Priority Data

Aug. 26, 2013   (CN) .................... 2013 2 05210990 U

(51) Int. Cl.
    *G06K 7/10*      (2006.01)
    *G06K 19/07*     (2006.01)
    *G02B 6/46*      (2006.01)

(52) U.S. Cl.
    CPC ........ *G06K 7/10356* (2013.01); *G06K 7/10376* (2013.01); *G06K 19/0723* (2013.01); *G02B 6/46* (2013.01)

(58) Field of Classification Search
    CPC ... G06K 7/10376; G06K 19/0723; G02B 6/46
    USPC .......................................... 235/375, 439, 492
    See application file for complete search history.

(56) References Cited

U.S. PATENT DOCUMENTS

2013/0205579 A1\* 8/2013 Mather et al. ................... 29/593
2015/0060539 A1\* 3/2015 Thompson .................... 235/375

\* cited by examiner

*Primary Examiner* — Christle I Marshall
(74) *Attorney, Agent, or Firm* — Novak Druce Connolly Bove + Quigg LLP

(57) ABSTRACT

A reader for reading radio frequency identification (RFID) tags of a fiber router. The reader includes a main body and a scanner portion. The main body includes a circuit board and at least one indicating lamp electrically connected to the circuit board. The scanner portion is coupled to the main body and includes at least one scanning protrusion. Each scanning protrusion corresponds to one of the at least one indicating lamps, each scanning protrusion includes an antenna electrically connected to the circuit board, and each antenna corresponds to the indicating lamp. Each antenna receives information from a RFID tag and transmits the information to the circuit board, and the circuit board controls the corresponding indicating lamp to emit indicating colors according to the information received by each of the antennas.

19 Claims, 4 Drawing Sheets

READER FOR FIBER ROUTER

CROSS-REFERENCE TO RELATED APPLICATIONS

The present application is related to the co-pending U.S. patent application Ser. No. 14/467,611, entitled "FIBER MANAGEMENT SYSTEM AND METHOD THEREOF". This application has the same assignee as the present application and has been concurrently filed herewith. The above-identified application is incorporated herein by reference.

FIELD

The present disclosure relates to readers, and particularly relates to a reader having radio frequency identification utility.

BACKGROUND

Optical Distribution Network (ODN) is used in Fiber to the x (FTTx) technic of telecommunication. Due to the ODN is a one-to-many standard, in one optical network connection spot can be coupled by multiple branch circuitries for transceiving network signals. There is a paper tag pasted on one branch circuitry for being identified. However, it's difficult for staff to manage multiple branch circuitries, especially when searching, inventorying, and maintaining are needed. Therefore staff may spend a great time may on daily management and has a low working efficiency.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
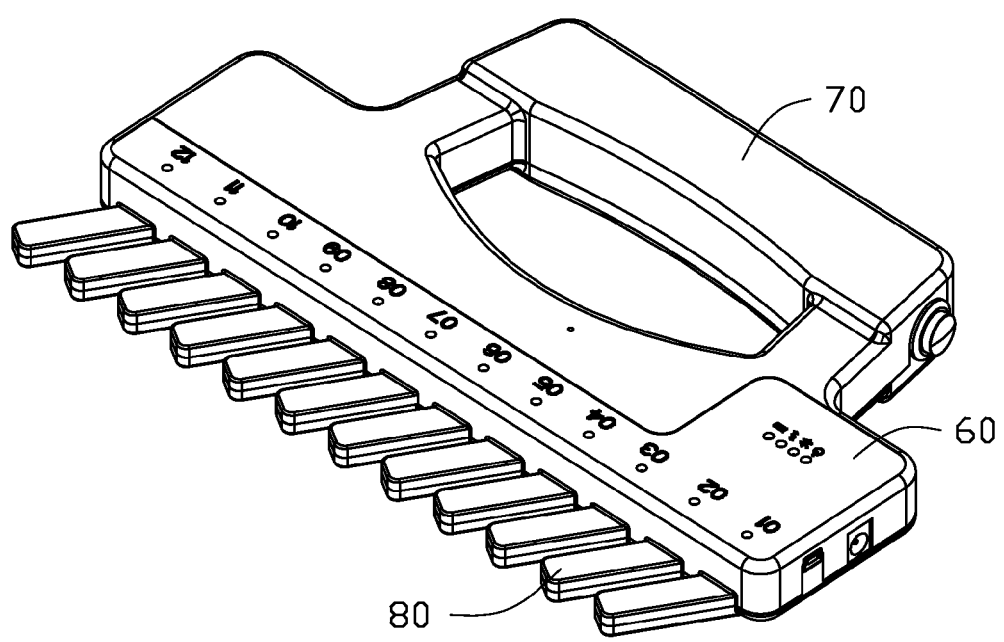
FIG. 1 is an isometric view of a first embodiment of a reader.
Figure 3:
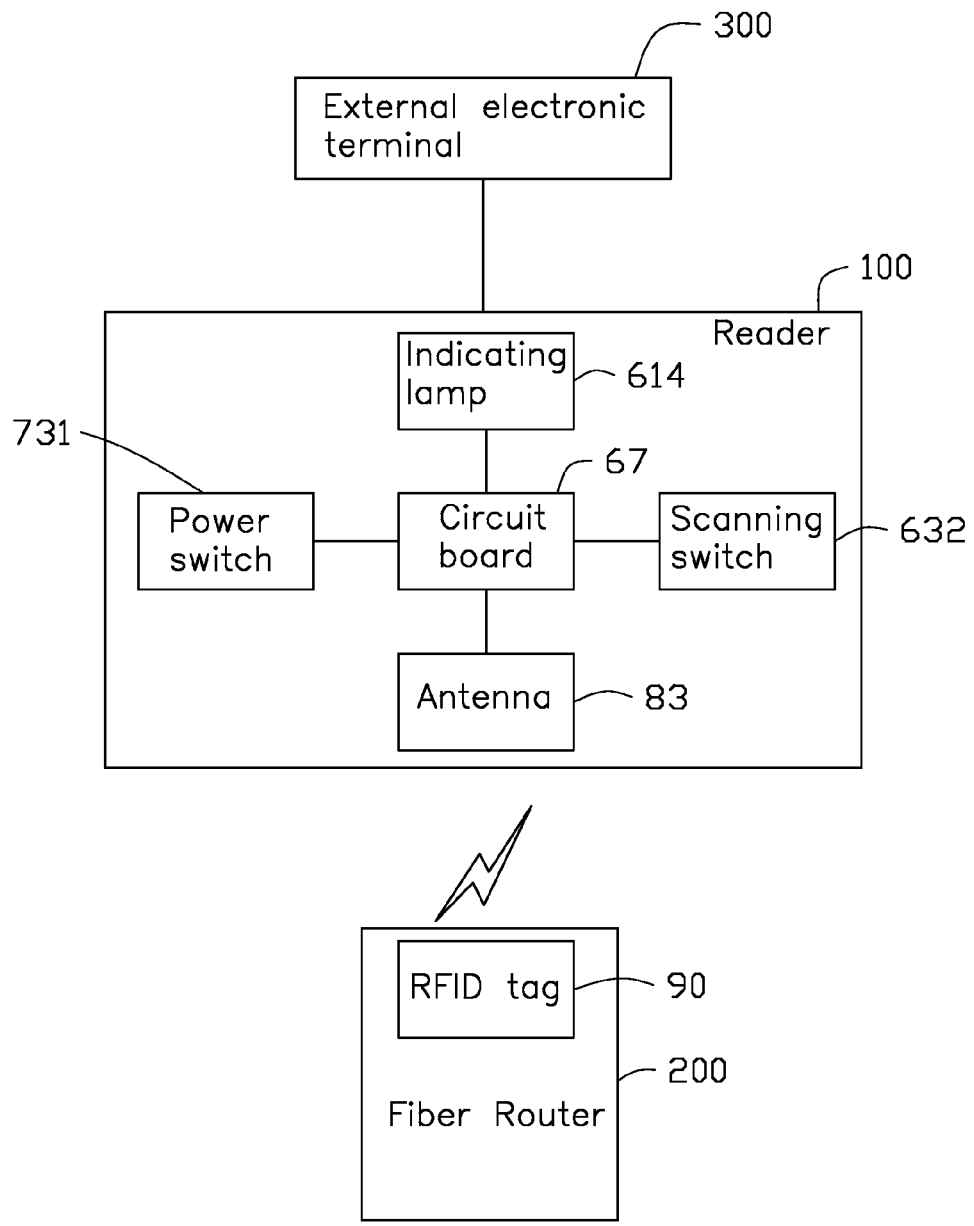
FIG. 3 is a functional block of the reader of FIG. 1.

FIGS. 1 and 3 illustrate a first embodiment of a reader 100. The reader 100 is used for reading information of fiber interfaces and fiber terminals of a fiber router 200. The fiber router 200 includes a plurality of ports, and each port includes a fiber interface, each fiber terminal can be coupled to one fiber interface. Each fiber interface and each fiber terminal has a radio frequency identification (RFID) tag 90 pasted thereon, and each RFID tag 90 stores information of the corresponding fiber interface or fiber terminal. When the reader 100 is electrically connected into the port of the fiber router 200, the reader 100 may read the information of the RFID tags 90 on the fiber interfaces and the fiber terminals.

The reader 100 includes a main body 60, a holder portion 70, and a scanner portion 80. The holder portion 70 and the scanner portion 80 are connected to opposite sides of the main body 60.

Figure 2:
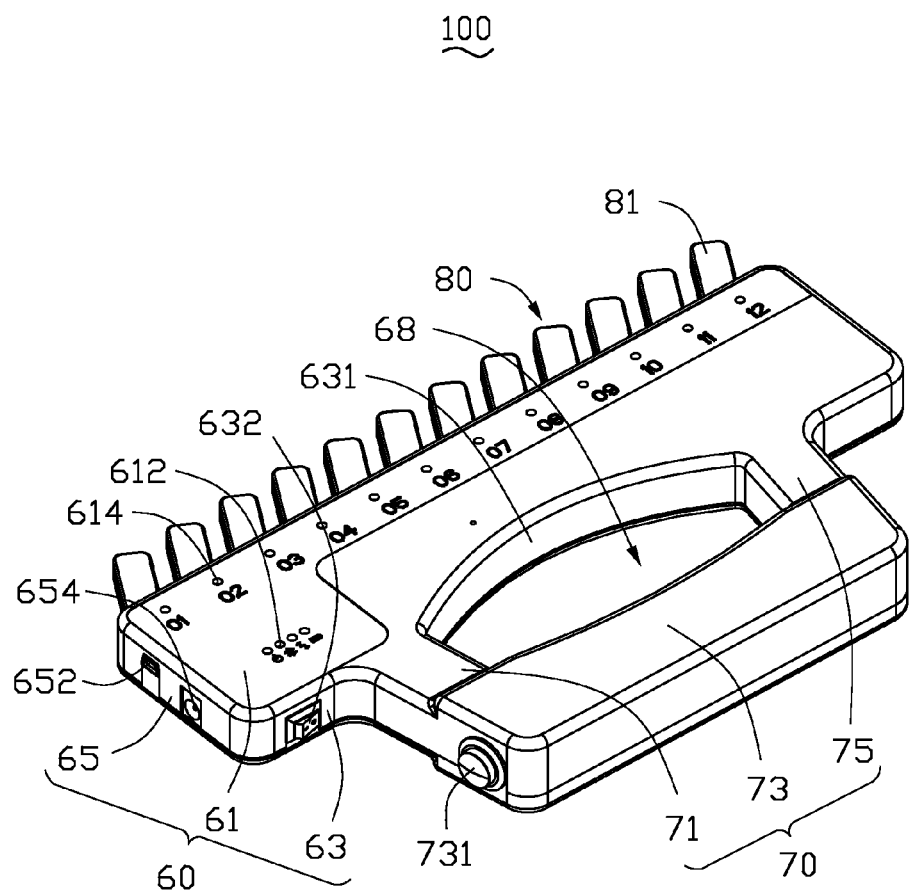
FIG. 2 is another isometric view of the reader of FIG. 1.

Referring to FIGS. 2 and 3, the main body 60 includes a plurality of electronic elements therein, such as processor and battery. The main body 60 includes two opposite planar walls 61, two opposite end walls 63, two opposite side walls 65, and a circuit board 67. One planar wall 61 includes several state lamps 612 thereon for indicating states of the reader 100, such as charging state and data transmitting state. The planar wall 61 further includes several indicating lamps 614 for indicating scanning results by color changing, for example. The indicating lamps 614 are electrically connected to the circuit board 67. In one embodiment, the indicating lamps 614 may change between red and green, to show different scanning results. One end wall 63 recesses an arcuate surface 631 in a middle portion, two opposite ends of the arcuate surface 631 connect to the holder portion 70. The end wall 63 further includes a scanning switch 632 adjacent to the arcuate surface 631, the scanning switch 632 is electrically connected to the circuit board 67 to turn on/off the scanner portion 80. The scanner portion 80 is arranged on the other end wall 63. One side wall 65 defines a data connector 652 and a power connector 654. The data connector 652 can connect to an external electronic terminal 300 to exchange data between the reader 100 and the external electronic terminal 300. The power connector 654 can connect to a power source to charge the reader 100.

The holder portion 70 and the main body 60 form a holding space 68 therebetween, the holding space 68 provides a space for user's hand hold. The holder portion 70 includes a first connecting end 71, a holding end 73, and a second connecting end 75 connected in that order. The first connecting end 71 and the second connecting end 75 are spaced from each other and connect to two opposite end of the arcuate surface 631, thereby enclosing the holding space 68. A power switch 731 is arranged on the holding end 73, the power switch 731 is electrically connected to the circuit board 67 for turning on/off the reader 100.

The scanner portion 80 includes a plurality of scanning protrusions 81 for reading the tags 90 of each fiber interface and each fiber terminal. In one embodiment, a quantity of the scanning protrusions 81 is twelve, each scanning protrusion 81 is corresponding to one indicating lamp 614, thus each indicating lamp 614 showing a scanning result corresponding to one scanning protrusion 81. The scanning protrusions 81 are slantways coupled to the end wall 63 and are parallel with each other, thereby adapting to the ports of the fiber router 200.

Each scanning protrusion 81 includes an antenna 83 electrically connected to the circuit board 67 for reading the information of the RFID tags 90 of the fiber interfaces and the fiber terminals and transmitting the information to the circuit board 67, the circuit board 67 can further process the information and forward to the external electronic terminal 300. The external electronic terminal 300 stores information of all the fiber interfaces and the fiber terminals of the fiber router 200. When the external electronic terminal 300 receives the information read by the reader 100, the external electronic terminal 300 match the stored information and the read information, thus to transmit a controlling command to the reader 100. In one embodiment, when the read information does not match to the stored information, the external electronic terminal 300 controls the indicating lamp 614 to turn red. When the read information matches to the stored information, the external electronic terminal 300 controls the indicating lamp 614 to turn green.

The frequency and insulation of the antennas 83 can be adjusted, therefore each antenna 83 can only read a corresponding fiber interface and a corresponding fiber terminal when the scanning protrusion 81 inserts into the fiber port, thereby preventing misreading.

When testing or maintaining a fiber router 200 with the reader 100, the power switch 731 is turned on, and then each scanning protrusion 81 is coupled to a fiber port of the fiber router 200. The scanning switch 632 is turned on, then each antenna 83 reads information of the RFID tag 90 on the fiber interface and the fiber terminal of the corresponding port, and the antenna 83 further forwards the information to the processor of the circuit board 67. The reader 100 transmits the information to an external electronic terminal 300 via the data connector 652 or wireless transmission, such as Bluetooth and WI-FI. The external electronic terminal 300 matches the read information with stored information prestored by user. When the read information does not match to the stored information, the external electronic terminal 300 controls the indicating lamp 614 to turn red. When the read information matches to the stored information, the external electronic terminal 300 controls the indicating lamp 614 to turn green. When all indicating lamps 614 emit indicating colors, user can easily find a malfunctioned fiber port. After scanning all the RFID tags 90, the scanning protrusion 81 can be disconnected from the fiber router 200, the scanning switch 632 can be turned off, thus the scanner portion 80 stop scanning.

Figure 4:
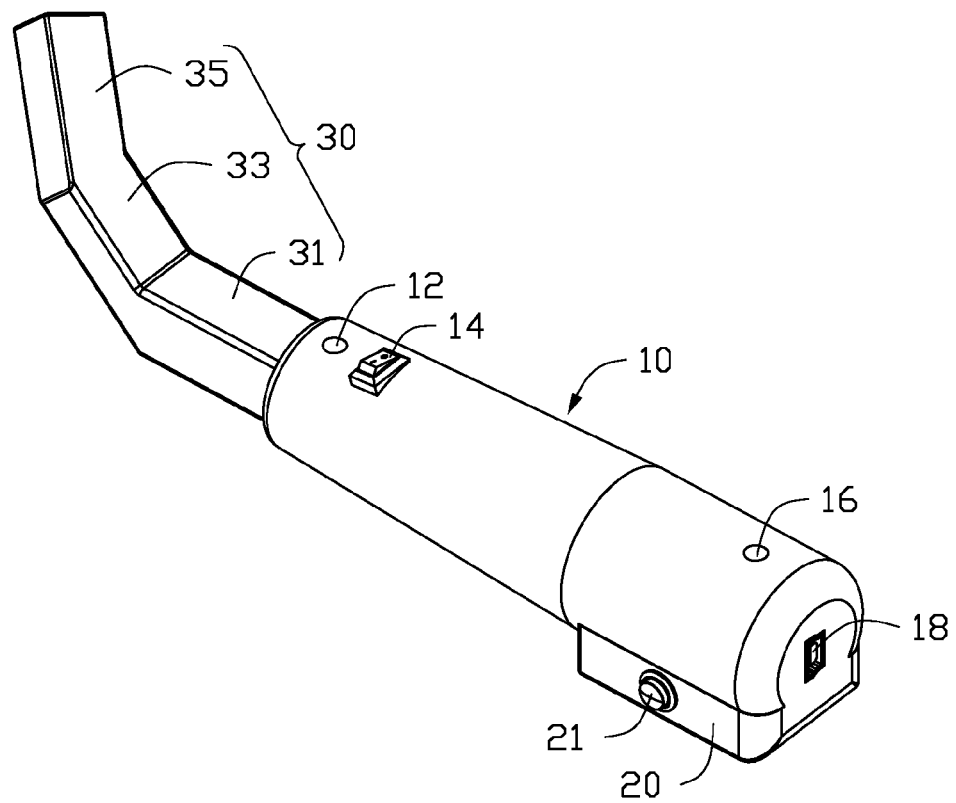
FIG. 4 is an isometric view of a second embodiment of a reader.

FIG. 4 illustrates a second embodiment of a reader 50. The reader 50 of the second embodiment has a same function with the reader 100 of the first embodiment, but has a different structure. The reader 50 of the second embodiment is for a single fiber port. The reader 50 includes a main body 10, a holder portion 20, and a scanner portion 30. The holder portion 20 and the scanner portion 30 are coupled to two opposite end of the main body 10.

The main body 10 is a substantially column shaped and includes an indicating lamp 12 and a scanning switch 14 on one end, and includes a power connector 16 and a data connector 18 on the other end. A shape of the holder portion 20 can be adjusted according to user's needs, which is for conveniently being held by a user. The holder portion 20 covers on the main body 10. A length of the holder portion 20 is less than a length of the main body 10. The holder portion 20 includes a power switch 21 thereon. The scanner portion 30 includes a connecting section 31, an extending section 33, and a scanning section 35. The connecting section 31 is coupled to the main body 10. The extending section 33 is slantways connected between the connecting section 31 and the scanning section 35. The structure of the scanner portion 30 can conveniently couple to a fiber port of the fiber router 200.

The reader 100 includes a plurality of indicating lamps 614 corresponding to the scanning protrusions 81 to indicate scanning results with different colors. Therefore, the malfunction port(s) can be discovered very quickly, saving time and optimizing a management of the fiber router 200.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A reader for reading radio frequency identification (RFID) tags of a fiber router, the reader comprising:
   a main body comprising a circuit board and at least one indicating lamp electrically connected to the circuit board; and
   a scanner portion coupled to the main body and comprising at least one scanning protrusion, each scanning protrusion corresponding to one of the at least one indicating lamps, each scanning protrusion comprising an antenna electrically connected to the circuit board, each antenna corresponding to the indicating lamp;
   wherein each antenna is configured to receive information from a RFID tag and transmit the information to the circuit board, and the circuit board is configured to control the corresponding indicating lamp to emit indicating colors according to the information received by each of the antennas;
   wherein the main body further comprises two opposite side walls, one side wall comprises a data connector and a power connector, the data connector connects to an external electronic terminal to exchange the read information of the RFID tags between the reader and the external electronic terminal; the power connector connects to a power source to charge the reader.

2. The reader as claimed in claim 1, wherein the scanning protrusions are slantways extending from the main body and are parallel with each other when the scanner portion comprises more than one scanning protrusions.

3. The reader as claimed in claim 1, wherein the main body comprises two opposite planar walls, one planar wall comprises several state lamps thereon electrically connected the circuit board, the state lamps indicates working states of the reader.

4. The reader as claimed in claim 1, wherein the main body further comprises two opposite end walls, one end wall recesses an arcuate surface in a middle portion and comprises a scanning switch adjacent to the arcuate surface, the scanning switch is electrically connected to the circuit board for switching the scanner portion.

5. The reader as claimed in claim 4, further comprising a holder portion, wherein the holder portion connects to two opposite ends of the arcuate surface and encloses a holding space with the arcuate surface.

6. The reader as claimed in claim 5, wherein the holder portion comprises a first connecting end, a holding end, and a second connecting end connected in that order, the first connecting end and the second connecting end are spaced from each other and connect to two opposite end of the arcuate surface, thereby enclosing the holding space.

7. The reader as claimed in claim 6, wherein the holding end comprises a power switch electrically connected to the circuit board for switching the reader.

8. The reader as claimed in claim 5, wherein the scanner portion and the holder portion are coupled to two opposite end walls of the main body.

9. The reader as claimed in claim 1, wherein the scanner portion comprises a connecting section, an extending section, and a scanning section, the connecting section is coupled to the main body, the extending section is slantways connected between the connecting section and the scanning section.

10. The reader as claimed in claim 1, wherein the main body further comprises a scanning switch adjacent to the indicating lamp on one end, and comprises a power connector and a data connector on the other end.

11. The reader as claimed in claim 1, further comprising a holder portion, wherein the holder portion covers on the main body, a length of the holder portion is less than a length of the main body.

12. The reader as claimed in claim 11, wherein the holder portion comprises a power switch thereon.

13. The reader as claimed in claim 1, wherein the fiber router comprises at least one port, each port comprises a fiber interface for connecting a fiber terminal, each port further comprises a RFID tag attached thereon, and the RFID tag stores information of the corresponding fiber interface or fiber terminal.

14. The reader as claimed in claim 13, wherein the scanning protrusion is electrically connected to the port and the antenna reads the information from the RFID tag.

15. A reader for reading radio frequency identification (RFID) tags of a fiber router, the reader comprising:
   having a scanner portion, at least one indicating lamp, and a circuit board, the scanner portion and the at least one indicating lamp electrically connected to the circuit board, the scanner portion configured to read information from RFID tags, the circuit board configured to control the at least one indicating lamp to emit indicating colors according to the information read by the scanner portion;
   aligning with the RFID tags via the scanner portion;
   reading information from the RFID tags via the scanner portion;
   matching the read information with prestored information of the RFID tags in the reader via the circuit board;
   controlling the at least one indicating lamp to emit indicating colors according to the matching results via the circuit board.

16. The reader as claimed in claim 15, further comprising inserting into the fiber router to align one scanning protrusion of the scanner portion to one RFID tag.

17. The reader as claimed in claim 15, further comprising prestoring information of all the RFID tags.

18. The reader as claimed in claim 15, further comprising forwarding the reading information to the circuit board.

19. The reader as claimed in claim 15, further comprising exchanging information and controlling commands with an external electronic terminal.

\* \* \* \* \*